(12) United States Patent
Cecava et al.

(10) Patent No.: US 7,951,408 B2
(45) Date of Patent: May 31, 2011

(54) METHODS OF FEEDING ANIMALS

(75) Inventors: Michael J. Cecava, Decatur, IN (US); Perry H. Doane, Decatur, IN (US); James L. Dunn, Decatur, IN (US)

(73) Assignee: ADM Alliance Nutrition Inc., Decatur, IL (US)

( * ) Notice: Subject to any disclaimer, the term of this patent is extended or adjusted under 35 U.S.C. 154(b) by 1371 days.

(21) Appl. No.: 11/445,555

(22) Filed: Jun. 2, 2006

(65) Prior Publication Data
US 2006/0222685 A1 Oct. 5, 2006

Related U.S. Application Data

(63) Continuation-in-part of application No. 10/246,720, filed on Sep. 19, 2002, now abandoned.

(60) Provisional application No. 60/324,593, filed on Sep. 25, 2001.

(51) Int. Cl.
*A23K 1/175* (2006.01)

(52) U.S. Cl. .......... 426/74; 426/635; 426/636; 426/637; 426/807; 424/442

(58) Field of Classification Search ................ 426/636, 426/637, 807, 635, 74; 424/442
See application file for complete search history.

(56) References Cited

U.S. PATENT DOCUMENTS 2,960,406 A * 11/1960 Cardon ............................ 426/2
5,629,038 A * 5/1997 Kalmbach ...................... 426/72

* cited by examiner

*Primary Examiner* — C. Sayala
(74) *Attorney, Agent, or Firm* — Andrew F. Nilles

(57) ABSTRACT

Methods and compositions for improved ruminant diets are disclosed. The invention relates to the use of metal ion/metal ion salts in ruminant feed, at levels from about 0.25 to about 1 g/kg dry matter, in any ruminant diet, for improvement of bypass protein content, as well as to influence the rate of rumen starch digestion and the flow of starch to the duodenum.

20 Claims, No Drawings

METHODS OF FEEDING ANIMALS

CROSS REFERENCE TO RELATED APPLICATIONS

This application is a continuation-in-part of U.S. patent application Ser. No. 10/246,720, filed Sep. 19, 2002, now abandoned, the contents of the entirety of which is incorporated by this reference, which itself claims priority to U.S. Provisional Application No. 60/324,593, filed Sep. 25, 2001.

TECHNICAL FIELD

The present invention relates to methods and compositions for the improvement of ruminant diets. More specifically, the present invention relates to the use of metal ions and/or their salts in feed to improve productive efficiency.

BACKGROUND

The importance of rumen digestion of protein in the productive efficiency of ruminant diet formulations has been recognized for a considerable time. Feeds entering the rumen environment are digested with variable efficiency, such that the contribution of protein and energy to the rumen fermentation, or alternately to the animal via rumen escape followed by intestinal digestion and absorption, varies widely among feedstuffs. The variability in feeding value amongst feeds and animal classes has led to the development of diet evaluation software incorporating digestion rates relating to a variety of nutritionally important protein and carbohydrate fractions (Dairy NRC 2001; Fox, et al., 1992.).

As summarized in such computer programs, the specific feed value of a dietary ingredient varies both with animal productivity and diet formulation or composition. As animal productivity increases, so do the nutritional requirements for amino acids, metabolizable protein and energy. At low levels of production, nutrition demands are more readily satisfied by the end products of rumen fermentation, such as volatile fatty acids for energy, and microbial proteins to supply metabolizable protein and amino acids. At elevated production levels the gross efficiency of nutrient digestion decreases, increasing the proportion of nutrients escaping rumen fermentation. The specific efficiency of microbial protein produced in the rumen is somewhat variable and difficult to predict, but does not increase sufficiently, such that rumen fermentation is unable to supply the quantity of metabolizable protein required to meet productive demands. This shortfall of rumen microbial protein production increases the dietary demand for rumen bypass protein. Thus, research efforts aimed at achieving continued increases in ruminant productive level and efficiency have emphasized the importance of the nutrients which escape or bypass rumen fermentation. Therefore, a number of rumen escape proteins are now available in the marketplace.

A parallel development to rumen escape protein has been an increase in dietary energy density to meet the energetic demands of increased production. For high production situations, this has increased the level of rumen fermentable carbohydrate in diets by raising starch levels. Increased feeding of starchy ingredients has led to increased concerns relating to rumen acidosis and the resulting loss of rumen fermentation efficiency and animal productivity.

A variety of methods have been used to reduce the rumen availability of vegetable protein. U.S. Pat. No. 3,619,200 proposes a rumen-inert coating of vegetable meal for protection against rumen microbial digestion. Treatment of feeds with tannin, formaldehyde, or other aldehydes can denature the protein and reduce ruminal fermentation (see U.S. Pat. No. 4,186,213), and rumen digestion of protein can be reduced by heating (Tagari et al., Brit. J. Nutr. 16:237-243 (1982)).

Hudson, et al., J. Anim. Sci. 30:609 (1970) presents an experiment comparing evaluating the effect of heating on SBM on the post ruminal nitrogen utilization by lambs. The results indicated slower protein digestion by rumen microflora.

Endres, et al., 1996, and Heitritter, et al., 1998 (U.S. Pat. Nos. 5,508,058 and 5,824,355, with references) summarize the procedures commonly used for production of heat-treated vegetable meals.

The patents of Meyer, 1987, 1988, and Endres, et al., 1996 (U.S. Pat. Nos. 4,664,905, 4,664,917, 4,704,287, 4,737,365, 5,508,058) disclose the use of zinc salts to protect animal feed protein from rumen degradation.

The patents of Meyer, 1987 and 1988 (U.S. Pat. Nos. 4,664,905, 4,664,917, 4,704,287, 4,737,365) established the use of relatively high levels of zinc salts to improve protein utilization in beef and dairy cattle and sheep. Incorporation levels of zinc were from 0.25 to 1.3% dry weight or alternately 0.005 to 0.0294 parts zinc ion per unit protein in a protein dry blend.

Endres, et al., 1996 (U.S. Pat. No. 5,508,058) disclose a method to produce heat treated vegetable protein incorporating zinc at a lower level than previously discovered (0.003 to 0.008 parts zinc per part protein). As discussed in that disclosure, the use of lower zinc levels is beneficial in reducing the excretion of zinc into the environment via animal manure while retaining efficacy of reducing rumen protein digestion of the protein feed.

SUMMARY OF THE INVENTION

In one embodiment, a method of feeding an animal comprises feeding an animal between 0.008 grams and 0.04 grams of metal ions of a soluble metal salt per kilogram of the animal's body weight per day.

In another embodiment, a method of feeding an animal includes mixing an animal feed with a soluble metal salt of zinc and a soluble metal salt of manganese, and feeding the animal feed containing the soluble metal salt of zinc and the soluble metal salt of manganese to an animal such that the animal receives between 0.008 grams and 0.04 grams of metal ions of the soluble metal salt of zinc and the soluble metal salt of manganese per kilogram of the animal's body weight per day.

In a further embodiment, a method of feeding animal comprises mixing an animal feed with a soluble metal salt of zinc and a soluble metal salt of manganese such that the animal feed contains between 0.25 grams and 1 gram of metals ions of the soluble metal salt of zinc and the soluble metal salt of manganese per kilogram of the animal feed. The method further comprises feeding the animal feed containing the soluble metal salt of zinc and the soluble metal salt of manganese to a ruminant such that the ruminant receives between 0.008 grams and 0.04 grams of metal ions of the soluble metal salt of zinc and the soluble metal salt of manganese per kilogram of the animal per day.

DETAILED DESCRIPTION OF THE INVENTION

The present invention relates to improved animal feed compositions comprising one or more metal ion(s) or metal salt(s) at a concentration of from about 0.25 gram to about 1 gram per Kilogram of feed dry matter. The present invention further relates to ruminant diet formulations comprising such improved feeds, and the process for making such improved feed compositions. The present invention also further relates to a process for improvement of the productive efficiency of a ruminant diet by providing to a ruminant a diet comprising such an improved animal feed.

This invention has a primary objective of retaining the efficacy equivalent to previous zinc use while further reducing the levels of zinc needed.

A further objective of this invention is to utilize zinc singly and in combination with other metals or metal salts to modify the rumen degradation of both protein and carbohydrates Previous work has focused on the ability of dry mixtures of metal salts to protect protein-containing feeds as part of protein supplements or complete feeds. In early efforts, manganese was evaluated for its ability to slow rumen protein digestion and was discounted in favor of zinc. However, the present inventors have found that, surprisingly, the use of zinc salts with manganese salts (manganous sulfate) in art-recognized methods of use leads to an unexpected synergistic reduction of rumen protein digestion, where the decrease in protein degradation is greater than that expected based on the levels of either element singly. Furthermore, a similar synergy has been achieved by adding soluble iron salts to the blend. Unexpectedly, the form of iron is particularly important, with ferrous iron preferred to other electron states. Recent research also demonstrates the ability of zinc salts and metal mixtures to influence the rate of rumen starch digestion and the flow of starch to the duodenum of dairy cattle.

In addition, the present invention takes advantage of the surprising finding that the effects of metal salts may be generalized to all dietary ingredients contributing protein, including forages, although the magnitude of effect is ingredient specific. Thus, the present invention relates to the use of metal salts, in combination with both amino acid formulation, and the formulation of the entire diet, to influence the amino acid and nutrient profile appearing at the duodenum, allowing increased animal performance.

The present invention discloses the use of zinc in combination with heat processing at levels from about 0.25 to about 1 g per kg dry matter (DM) of the feed (meal or forage) being utilized. Further, combinations of water soluble salts (such as sulfate salts, although it is important to note that all water soluble salts, and combinations of metals or metal salts, may be used in the practice of the invention), of zinc, manganese and iron (such as the ferrous form of iron) may be provided in animal diets singly or in combination at a total concentration of between about 250 and about 750 ppm of diet DM to increase rumen escape of diet protein, to reduce ruminal ammonia production, and to reduce the fermentation rate of dietary starch. In addition, when combined with dietary formulation of amino acid profiles, incorporation of water soluble zinc, manganese, or iron salts may be utilized to modify the profile of amino acids appearing in the post-ruminal digesta flow.

The present invention may be practiced in any ruminant diet. To obtain the desired results, diets may be formulated to contain single metal ion forms or combinations of metal ions at concentrations from about 0.25 to about 1 g/kg of diet dry matter. In practice metal salts may be incorporated directly into the animal diets, or mixed into commercial supplements or liquid feeds. As those of ordinary skill in the art will recognize, absolute concentrations of the metal salts incorporated into supplements will be dependent on the dietary inclusion rate of the supplemental feed. For example, and not by way of limitation, to an animal eating 25 kg dry matter per day, a mineral supplement or liquid feed offered at 1 kg dry matter per day may be expected to contain between 6.25 to 25 g metal ion per kg of the supplement. If the supplemental inclusion rate were to increase to 10 kg dry matter per day the corresponding concentrations would be 0.625 to 2.5 g metal ion per kg of supplement dry matter.

This invention may also be used to improve the bypass protein content of animal feeds in combination with moist heat treatment. For example Heitritter, 1998, discloses the use of a moist heat treatment process. To utilize this invention in combination with heat treatment of protein meals, zinc or metal combinations may be blended into the protein meal entering the process at a rate to obtain from about 0.25 to about 1 g of metal ion per kg of feed dry matter, utilizing either dry mixtures or liquid application of salts. Alternately, the metal blends may be incorporated into the feed ingredient after the initial cooking process but prior to the drying of the final mixture.

During the work related to development of this invention, an interaction between processing method and zinc concentration was determined which allowed for the reduction of zinc concentration to between about 0.25 and about 1 g/kg of feed material, or to a level of about one-third the amount previously reported. Table 1 presents the results of a test addressing the interaction of moist heat treatment of soybean meal and zinc application. The expectation at the time was that the response in rumen undegradable protein (RUP) required zinc levels above 1300 ppm in meal DM. Surprisingly, however, there was a clear relationship between zinc concentration and bypass protein content/RUP even at lower than expected metal concentrations.

TABLE 1

Influence of zinc and heat treatment on the rumen undegradable protein content (RUP) of soybean meal

| Sample | Zinc, ppm | RUP, % CP |
|--------|-----------|-----------|
| 4 | 262 | 66.5 |
| 14 | 472 | 67.9 |
| 25 | 1010 | 69.1 |
| 36 | 1721 | 70.2 |

In a second embodiment, improvements over the state of the art by the use of combinations of zinc and manganese or combinations of zinc, manganese and ferrous iron to influence rumen fermentation and animal performance are disclosed. These improvements occur when metals are provided at concentrations ranging from about 250 to about 1000 ppm total metal ion in diet DM. Specifically, dietary inclusion of metal combinations has been shown to reduce rumen protein digestion (increase RUP), reduce ammonia release from protein and reduce milk urea nitrogen levels, and slow the rate of rumen starch digestion. Thus, depending on diet formulation methods, metal addition may be used to influence the profile of nutrients appearing at the duodenum for absorption.

Having provided a general description, the invention will now be more readily understood through reference to the following examples, which are provided by way of illustration, and which are not intended to limit the present invention.

EXAMPLES

Example 1

In vitro digestion of alfalfa silage, a complete dairy pellet, and dairy total mixed ration TMR) was performed using an artificial rumen system (Ankom Daisy System, Ankom Technology, Fairport, N.Y.) in a partial factorial arrangement of treatments incorporating zinc or manganese, at two levels, singly or in combination, to evaluate effects on rumen protein digestion. Metals were incorporated at 150 or 300 mg/L. As shown in Table 2, zinc has a general effect on protein digestion while the effect of manganese is more moderate. The 'Additive' column presents the expected results based on a simple additivity of the manganese and zinc concentrations. The combination of zinc and manganese reduces protein digestion in a manner similar to the zinc only treatment although the level of zinc has been reduced by 50%. These data extended previous findings, demonstrating that zinc and the zinc-manganese addition improved the rumen bypass protein content of alfalfa forage and dairy TMR samples as measured in the artificial rumen system (Table 3). Previous efforts focused on the digestion of high protein feeds such as oilseed meals.

TABLE 2

Average rumen undegraded protein, % of protein, for all samples

| Metal inclusion | Zinc (Zn) | Manganese (Mn) | 'Additive' | Zn/Mn, 50:50 |
|---|---|---|---|---|
| 0 | 40.2 | — | — | — |
| 150 mg/L | 45 | 43.2 | 42.7 | 44.2 |
| 300 mg/L | 48 | 42.5 | 45.3 | 47.4 |

TABLE 3

Effect of dietary metal addition on rumen undegraded protein

| Metal inclusion | Zinc (Zn) | Manganese (Mn) | Zn/Mn, 50:50 |
|---|---|---|---|
| Dairy Concentrate Feeds | | | |
| 0 | 47.8 | | |
| 150 mg/L | 61.4 | 50.9 | 55.7 |
| 300 mg/L | 63.5 | 52.3 | 67.4 |
| Alfalfa Haylage | | | |
| 0 | 24.6 | | |
| 150 mg/L | 24.4 | 26.1 | 31.3 |
| 300 mg/L | 28.2 | 24.8 | 25.5 |

Example 2

Samples of soybean meal (SBM), heat treated soybean meal, canola meal, heat treated canola meal, and cottonseed meal was fermented in vitro in combination with zinc sulfate, or ferric or ferrous iron sulfate. In those fermentations containing metal, metal ions were added to obtain a concentration of 150 mg/L. Relative to controls with no metal addition all metals increased RUP content measured after 16 h of fermentation (Table 4). Surprisingly, the ferrous form of iron was substantially more effective than the ferric ion for decreasing rumen protein digestion.

TABLE 4

Mean RUP and Metal Effects for Individual Ingredients

| | Treatment | | | | |
|---|---|---|---|---|---|
| Ingredient | Control | Ferric Iron | Ferrous Iron | Zinc | 50:50 Zinc and Manganese |
| SBM | $28.6^a$ | $29.1^a$ | $42.9^b$ | $56.4^c$ | 59.7 |
| Canola | $46.5^a$ | $51.6^{ab}$ | $57.7^b$ | $57.3^b$ | 66.3 |
| Cottonseed | $56.3^a$ | $58.4^b$ | $62.1^{bc}$ | $64.4^c$ | 66.3 |
| Heated Canola | $79.7^a$ | $81.1^a$ | $83.5^b$ | $85.2^b$ | 85.9 |
| Heated SBM | $78.6^a$ | $81.7^{ab}$ | $83.9^b$ | $85.2^b$ | 85.6 |

$^{a,b,c}$Means within row with different superscripts differ P < .05.

Example 3

Lactating Holstein dairy cows were randomly divided into two groups based on production, days in milk and parity. Both groups of animals received diets based on alfalfa and corn silage supplemented with a commercial concentrate. The treatment diet was formulated to provide 300 ppm of a 50:50 blend of zinc and mangenous sulfate. Calculated soluble protein supplied was 40% of dietary crude protein (CP). The level of heat treated soybean meal was reduced in the metal containing diet to account for the effects on protein digestion (calculated as two percentage decrease in RUP, % of dietary CP). Both diets were formulated to contain RUP of a similar amino acid profile. There were no differences in milk production or milk component levels. There was a significant decrease in milk urea nitrogen levels with metal inclusion. These data demonstrate the effects of metal ions on performance by lactating cows, and are comparable to prior art in which zinc alone was used. The difference in the present example is that combining metals affords efficiency with lower concentrations of zinc than expected being necessary in the final feed product.

TABLE 5

Effects of Zinc and Manganese on Milk Yield by Lactating Cows

| Item | Control | Zn/Mn | SE | P = |
|---|---|---|---|---|
| Diet CP | 19.05 | 18.98 | — | — |
| Diet Zn, ppm | 88 | 216 | — | — |
| Diet Mn, ppm | 78 | 211 | — | — |
| Milk, kg/d | 35.6 | 35.6 | .63 | .86 |
| Milk Fat, % | 3.49 | 3.43 | .06 | .52 |
| Milk Protein, % | 2.9 | 2.92 | .02 | .24 |
| MUN[1], mg/ml | 14.9 | 14.1 | .20 | .02 |

[1]MUN = milk urea nitrogen

Example 4

Individually fed crossbred wether lambs were fed diets containing 14% CP (as a negative control) or 16% CP with low or high RUP content to examine the feeding of divalent metals singly or in combination. Bypass protein content was increased by feeding higher amounts of heat-treated soybean meal. In the 16%, Low RUP diet, the following metal additions were tested: 500 ppm Zn; 250 ppm Zn:250 ppm Mn; and 170 ppm Zn: 170 ppm Mn: 170 ppm Fe. All metals were added in the sulfate form, and iron was in the form of ferrous sulfate. Feeding the 16% CP: High RUP diet or adding metals to the 16% CP: Low RUP tended to decrease gain and feed efficiency with only small effects on feed intake relative to that obtained with the 16%, low RUP diet (Table 6).

TABLE 6

Performance of lambs receiving zinc, or zinc, manganese, iron combinations

| Diet Description | Negative Control | High CP Low RUP | High CP High RUP | High CP Low RUP + Zn | High CP Low RUP + Zn/Mn | High CP Low RUP + Zn/Mn/Fe | SEM |
|---|---|---|---|---|---|---|---|
| CP, % | 14.0 | 16.0 | 16.0 | 16.0 | 16.0 | 16.0 | |
| RUP, % | 5.0 | 5.2 | 6.4 | 5.2 | 5.2 | 5.2 | |
| Initial weight, kg | 24.4 | 23.2 | 24.7 | 24.7 | 24.0 | 23.9 | 1.2 |
| 42 day weight, kg | $40.1^b$ | $44.2^a$ | $43.7^a$ | $43.8^a$ | $42.7^{a,b}$ | $41.8^{a,b}$ | 1.4 |
| DMI[1], kg/day | $1.50^b$ | $1.59^{a,b}$ | $1.62^{a,b}$ | $1.66^a$ | $1.51^b$ | $1.49^b$ | 0.05 |
| Total Gain, kg | $15.84^b$ | $20.44^a$ | $18.96^a$ | $18.81^a$ | $18.88^a$ | $18.30^a$ | 1.12 |
| ADG[1], g/day | $394^c$ | $486^a$ | $464^{a,b}$ | $451^{a,b}$ | $446^{a,b}$ | $429^{b,c}$ | 17 |
| G/F[1] × 100 | $26.5^b$ | $30.7^a$ | $28.7^{a,b}$ | $27.3^b$ | $29.6^a$ | $28.9^{a,b}$ | 1.1 |

$^{a,b,c}$Means in the same row with different superscripts are different (P < 10).
[1]DMI = dry matter intake,
ADG = average daily gain,
G/F = ratio of weight gain to feed intake Using the data presented in Table 6, the amount of metal ions fed to the lambs can also be expressed in grams of metal ions per kilogram of the lamb's body weight per day. For instance, Table 6A presents the data of Table 6 in a different format. The average body weight is determined by dividing the sum of the initial weight and the 42 day weight of the lamb by 2. The grams of metal ions fed to the lamb per kg of the lamb's body weight per day is determined by: multiplying the DMI (kg/day) times the metal ion concentration (grams of metal ions per kg of dry feed), resulting in the amount of metal ions in grams fed to the lamb per day; the amount of metal ions in grams fed to the lamb per day is divided by the average body weight of the lamb, thus resulting in the grams of metal ions fed to the lamb per kg of the lamb's body weight per day.

TABLE 6A

| | Initial weight (kg) | 42 day weight (kg) | DMI (kg/day) | Average Body weight ([Initial weight + 42 day weight]/2) | Grams of metal ions fed to lamb per kg of lamb's body weight per day |
|---|---|---|---|---|---|
| Lambs fed 500 ppm Zn (i.e., 0.5 g metal ions/kg of dry feed) | 24.7 | 43.8 | 1.66 | 34.25 | 0.024 |
| Lambs fed 250 ppm Zn and 250 ppm Mn (i.e., 0.5 g metal ions/kg of dry feed) | 24.0 | 42.7 | 1.51 | 33.35 | 0.023 |
| Lambs fed 170 ppm Zn, 170 ppm Mn, and 170 ppm Fe (i.e., 0.51 g metal ions/kg of dry feed) | 23.9 | 41.8 | 1.49 | 32.85 | 0.023 |

Although the effects of additional RUP were negative on animal performance for this model animal system, the data substantiate the use of low amounts of zinc, or combinations of zinc manganese and iron to influence rumen protein digestion. The level of response to metal addition was equivalent to that of the heat treated SBM.

Example 5

A six week lactation study was conducted using 59 Holstein cows to test the effects of zinc on performance and the interaction with dietary bypass protein content (RUP). Treatments were administered by adjusting the RUP in the 20% CP dairy complete feed from 8.0% (Control) to 9.0% RUP (Control+RUP) and zinc from 245 ppm (Control) to 1020 ppm of zinc (Control+Zinc). This provided 755 ppm zinc from zinc sulfate in a ratio of 0.003 part zinc ion per part protein in the complete feed. The source of RUP was a combination of heated soybean meal, corn gluten meal, and distiller dried grains. Increasing dietary zinc numerically improved milk yield by 1.1 kg/d or 3.4%. Feeding higher amounts of bypass protein did not improve yield. Without intending to be limited by theory, these results suggest that zinc may be affecting the supply of nutrients besides protein that are critical for lactation. Zinc may decrease ruminal digestion of fiber and nonfiber so that more of these components are supplied to the intestines. This phenomena may be detrimental in the case of fiber but potentially beneficial in the case of nonfiber (e.g., starch) because energy supply to the cow may be improved. The potential for zinc to shift the site of carbohydrate digestion from the rumen to the intestines has not been described previously.

TABLE 7

Milk production of cows receiving zinc or RUP

| Item | Control | Control + Zn | Control + RUP |
|---|---|---|---|
| Milk, kg/d | 32.1 | 33.2 | 31.8 |
| Milk Fat, % | 3.30 | 3.25 | 3.33 |
| Milk Protein, % | 3.21 | 3.20 | 3.25 |

Example 6

A study was performed to examine whether increasing dietary zinc and/or RUP content would affect ruminal digestion and the flow of amino acids to the small intestine of lactating dairy cows. Cows were fed a TMR containing low and high amounts of RUP and low or high concentrations of zinc (zero or additional 250 ppm zinc from zinc sulfate). The concentration of RUP in high and low RUP diets were manipulated by changing the proportions of low RUP feeds (soybean meal, canola) and high RUP feeds (heated soybean meal, corn gluten meal). Feeding higher amounts of zinc shifted site of nutrient digestion from the rumen to the small intestines. A surprising observation was the effect of zinc on rumen digestion of starch. In both the low and high RUP diets, feeding higher concentrations of zinc reduced the digestion of starch in the rumen.

TABLE 8

Effects of RUP level and zinc on rumen nutrient digestion

| Item | Low RUP, Low Zn | Low RUP, High Zn | High RUP, Low Zn | High RUP, High Zn |
|---|---|---|---|---|
| Dry matter intake, kg/d | 22.8 | 21.8 | 21.5 | 22.2 |
| Intestinal Amino Acid flows, g/d | | | | |
| Lysine | 187.2 | 183.3 | 182.6 | 200.0 |
| Methionine | 51.6 | 49.0 | 56.1 | 58.2 |
| Total Essential | 1398 | 1331 | 1469 | 1601 |
| Amino Acids Ruminal digestion, % of intake | | | | |
| Organic Matter | 54.1 | 47.3 | 45.5 | 45.5 |
| Neutral Detergent Fiber | 33.5 | 22.0 | 24.0 | 24.8 |
| Starch | 67.0 | 53.6 | 64.3 | 52.8 |

Using the data presented in Table 8, the amount of metal ions fed to the cows can also be expressed in grams of metal ions per kilogram of the cow's body weight per day. For instance, Table 8A presents the data of Table 8 in a different format. The average body weight is determined by the fact that an average mature dairy cow weighs about 640 kg. The grams of metal ions fed to the cow per kg of the cow's body weight per day is determined by: multiplying the DMI (kg/day) times the metal ion concentration (grams of metal ions per kg of dry feed), resulting in the amount of metal ions in grams fed to the cow per day; the amount of metal ions in grams fed to the cow per day is divided by the average body weight of the cow, thus resulting in the grams of metal ions fed to the cow per kg of the cow's body weight per day.

TABLE 8A

| | DMI (kg/day) | Average Body weight | Grams of metal ions fed to lamb per kg of lamb's body weight per day |
|---|---|---|---|
| Cows fed 250 ppm Zn (i.e., 0.25 g metal ions/kg of dry feed) | 21.8 | 640 | 0.0085 |
| Cows fed 250 ppm Zn (i.e., 0.25 g metal ions/kg of dry feed) | 22.2 | 640 | 0.0087 |

Example 7

In vitro digestions of a complete dairy pellet, and a dairy total mixed ration TMR) were performed using an artificial rumen system (Ankom Daisy system) to evaluate the effects of metal ions on rumen starch digestion. Treatments formed a partial factorial arrangement incorporating zinc or manganese, at 150 or 300 mg/L of metal in the in vitro media, singly or in combination, to evaluate rumen starch digestion. Inclusion of zinc or the zinc and manganese combination increased the rumen undegraded starch measured at 16 h and decreased the calculated kinetic rate for starch digestion. The decrease of in vitro pH over the first 16 hours of fermentation was moderated by the inclusion of zinc or zinc-manganese blend as was the rate of decline. The total decline in pH over the 48 hour fermentations (initial pH—final pH) was not statistically different.

TABLE 9

Mean Effect of Metal Addition on In Vitro Starch Digestion and pH

| Item | Control | Zinc | | Manganese | | 50:50 Zinc + Manganese | | SE | Main Effects[1] | | |
|---|---|---|---|---|---|---|---|---|---|---|---|
| Concentration, mg/L | 0 | 150 | 300 | 150 | 300 | 150 | 300 | SE | Zn | Mn | Zn/Mn |
| Item | | | | | | | | | | | |
| Rumen Undegraded Starch (16 hours), % | 8.6 | 13.2 | 12.0 | 5.1 | 8.0 | 13.2 | 15.6 | 1.9 | 4.0 | −2.0 | 5.8* |
| Ammonia mg/dL | 31.4 | 30.8 | 29.7 | 32.1 | 34.2 | 30.6 | 29.9 | 1.8 | −1.1 | 1.8 | −1.2 |
| Initial pH | 6.74 | 6.69 | 6.60 | 6.65 | 6.64 | 6.68 | 6.62 | .03 | −.1** | −.1** | −.09** |
| pH at 16 hours | −.37 | −.35 | −.28 | −.28 | −.34 | −.32 | −.32 | .03 | .05* | .05* | .05* |
| pH at 48 hours | −.32 | −.30 | −.23 | −.30 | −.27 | −.30 | −.25 | .03 | .05 | .03 | .05 |
| Digestion Rates, % per hour | | | | | | | | | | | |
| Rumen Undegraded Starch (16 hours) | −.135 | −.096 | −.098 | −.137 | −.132 | −.105 | −.102 | .007 | .038** | 0.0 | .031** |
| pH Decline | .233 | .209 | .205 | .135 | .247 | .221 | .220 | .04 | −.027 | −.043 | −.013 |

[1] $P < .1 = *$,
$P < .05 = **$.

Example 8

A study was conducted using four duodenally cannulated Holstein cows to investigate the effect of a zinc:manganese blend on the rumen digestion of starch and soluble fiber. Diets contained 10.9 kg alfalfa silage, 3.6 kg mixed hay, 1.4 kg hay pellets, 9.1 kg complete supplement and 2.7 kg of corn/soyhulls or beet pulp/soyhulls (non-forage fiber, or NFF). Dietary RUP was formulated to 32.5% of CP, and the RUP lysine and methionine was adjusted to a 3:1 ratio. Diets containing added metal contained 400 ppm of metal added as 50:50 zinc and manganese. In this study, numerical decreases in rumen starch digestion were associated with greater rumen pH, altered volatile fatty acid (VFA) profile, and significantly increased microbial efficiency (Table 10).

TABLE 10

Effects of non-fiber carbohydrate type and metal addition on rumen nutrient digestion

| Item | Corn | NFF[a] | Diet Corn Zn/Mn | NFF Zn/Mn | SEM | P = NFC source | Zn/Mn | Metal and NFC |
|---|---|---|---|---|---|---|---|---|
| Dry Matter Intake, kg/d | 20.2 | 18.8 | 17.7 | 20.2 | .09 | .55 | .60 | .10 |
| Rumen Digestion, % intake | | | | | | | | |
| Organic Matter | 31.1 | 40.8 | 32.5 | 40.9 | 1.7 | .01 | .65 | .63 |
| Neutral Detergent Fiber | 33.4 | 43.0 | 27.6 | 35.5 | 8.0 | .28 | .42 | .90 |
| Starch | 75.9 | 66.6 | 64.0 | 61.2 | 9.8 | .60 | .56 | .53 |
| Duodenal flow | | | | | | | | |
| Non-Microbial N, % N intake | 57.5 | 52.3 | 50.0 | 45.0 | 3.4 | .17 | .10 | .99 |
| Microbial N, % N flow | 48.8 | 46.5 | 56.1 | 59.2 | 2.9 | .86 | .03 | .32 |
| Microbial Efficiency g of N/kg organic matter digested | 32.4 | 24.6 | 36.2 | 31.8 | 1.3 | .01 | .02 | .18 |
| Average Rumen pH | 5.77 | 5.96 | 5.83 | 5.81 | .13 | .50 | .76 | .42 |
| Acetate:Propionate Ratio | 2.60 | 2.80 | 2.96 | 2.72 | 0.09 | .85 | .12 | .04 |

[a] NFF = non-forage fiber (beetpulp and soyhulls)
b NFC = non-fiber carbohydrate The amount of metal ions fed to animals may also be expressed in terms of an amount of metal ions of a soluble metal salt per kilogram of the animal's body weight per day. In one embodiment, an animal may be fed between about 0.008 and 0.04 grams of metal ions of a soluble metal salt per kilogram of the animal's body weight per day.

For instance, as disclosed in Example 4, lambs were fed 170 ppm (or 0.17 g/kg) of at least one metal ion (i.e., Zn, Mn or Fe), which amounted to about 0.008 grams of metals ions per kilogram of the animal's body weight per day, calculated as follows: [0.17 g/kg of metal ions] times [1.49 kg/day feed (DMI)] which equals about 0.2533 grams of metal ions per day. Dividing 0.2533 grams of metal ions per day by an average weight of 32.85 kg of the lamb equals about 0.008 (i.e., 0.0077) grams of metals ions per kilogram of the lamb's body weight per day.

Further, as disclosed, the metal ions may be present in a diet fed to an animal at from about 0.25 g to about 1 g of metal ions per kg of animal feed. Thus, when metal ions are fed to a cow in an animal feed having a concentration of about 1 g of metal ions per kg of animal feed, the cow consumes about 25 kg of the animal feed as stated, and since the cow has a known average weight of about 640 kg, the cow would consume about 0.04 grams of metal ions of a soluble metal salt per kilogram of the cow's body weight per day as calculated by: [1.0 g/kg of metal ions] times [25 kg/day feed (DMI)] which equals about 25 grams of metal ions per day. Dividing 25 grams of metal ions per day by an average weight of 640 kg of the cow equals about 0.04 (i.e., 0.039) grams of metals ions per kilogram of the animal's body weight per day.

In view of the foregoing description and examples, those skilled in the art will be able to practice the invention, in its various embodiments and equivalents, without undue experimentation, and without departing from the spirit and scope of the invention as defined in the appended claims.

What is claimed is:

1. A method of reducing protein digestion in a rumen of a ruminant comprising:
   mixing a protein containing feed with a soluble metal salt of zinc and a soluble metal salt of manganese, thus producing a feed product having between 0.075 grams to 0.3 grams of metal from the soluble metal salt of manganese per kilogram of the feed product; and
   feeding the feed product to the ruminant such that the ruminant receives between 0.008 grams and 0.04 grams of the metal from the soluble metal salt of zinc and the soluble metal salt of manganese per kilogram of the ruminant's body weight per day.

2. The method according to claim 1, further comprising mixing a soluble metal salt of iron with the protein containing feed.

3. The method according to claim 1, wherein the protein containing feed is selected from the group consisting of a supplement, a liquid feed, a dry feed, and combinations of any thereof.

4. The method according to claim 3, further comprising processing the protein containing feed with moist heat treatment.

5. The method according to claim 1, wherein the protein containing feed is selected from the group consisting of alfalfa forage, alfalfa silage, mixed hay, soybean meal, heat treated soybean meal, soy hulls, canola meal, heat treated canola meal, cotton seed meal, corn silage, corn gluten meal, distiller dried grains, corn hulls, beet pulp, and combinations of any thereof.

6. The method according to claim 1, wherein the soluble metal salt of zinc is zinc sulfate and the soluble metal salt of manganese is manganese sulfate.

7. The method according to claim 1, wherein the ruminant is a sheep or a cow.

8. A method of improving productive efficiency in a Ruminant comprising:
   mixing an animal feed with a soluble metal salt of zinc and a soluble metal salt of manganese, thus producing a feed product having between 0.075 grams to 0.3 grams of metal from the soluble metal salt of manganese per kilogram of the feed product; and feeding the feed product to a ruminant such that the ruminant receives between 0.008 grams and 0.04 grams of metal from the soluble metal salt of zinc and the soluble metal salt of manganese per kilogram of the animal's body weight per day.

9. The method according to claim 8, further comprising processing the animal feed with moist heat treatment.

10. The method according to claim 8, further comprising mixing the animal feed with a soluble metal salt of iron selected from the group consisting of ferric iron sulfate or ferrous iron sulfate.

11. The method according to claim 8, wherein the animal feed is selected from the group consisting of a supplement, a liquid feed, a dry feed, and combinations of any thereof.

12. The method according to claim 8, wherein the ruminant is a sheep or a cow.

13. A method of reducing starch digestion in a rumen of a ruminant comprising:

mixing a starch with a soluble metal salt of zinc and a soluble metal salt of manganese, thus producing an animal feed containing between 0.25 grams and 1 gram of metal from the soluble metal salt of zinc and the soluble metal salt of manganese per kilogram of the animal feed; and feeding the animal feed containing the soluble metal salt of zinc and the soluble metal salt of manganese to a ruminant such that the ruminant receives between 0.008 grams and 0.04 grams of metal from the soluble metal salt of zinc and the soluble metal salt of manganese per kilogram of the ruminant per day.

14. The method according to claim 13, wherein the animal feed is selected from the group consisting of a supplement, a liquid feed, feed dry matter, and combinations of any thereof.

15. The method according to claim 13, further comprising processing the animal feed with moist heat treatment.

16. The method according to claim 1, wherein the ruminant is lactating.

17. The method according to claim 1, wherein the protein containing feed has not been processed with moist heat.

18. The method according to claim 1, further comprising mixing an amino acid with the feed product.

19. The method according to claim 8, wherein the soluble metal salt of zinc is present in the animal feed at an amount of between 0.15 grams and 0.25 grams per kilogram of the animal feed and the soluble metal salt of manganese is present in the animal feed at an amount of between 0.15 grams and 0.25 grams per kilogram of the animal feed.

20. The method according to claim 1, wherein the soluble metal salt of zinc is present in the animal feed at an amount of between 0.075 grams and 0.3 grams per kilogram of the animal feed.

* * * * *